Jan. 12, 1960　　　　T. B. RHODES　　　2,920,564
ENGINE STARTER CARTRIDGES
Filed Jan. 7, 1958　　　　　　　　　　2 Sheets-Sheet 2

INVENTOR
TOM BLACAS RHODES

BY Cushman, Darby, Cushman
ATTORNEYS

United States Patent Office 2,920,564
Patented Jan. 12, 1960

2,920,564

ENGINE STARTER CARTRIDGES

Tom Blacas Rhodes, Ardrossan, Scotland, assignor to Imperial Chemical Industries Limited, London, England, a corporation of Great Britain Application January 7, 1958, Serial No. 707,617

Claims priority, application Great Britain February 22, 1957

5 Claims. (Cl. 102—39)

This invention relates to improvements in starter cartridges for the actuation of engine starters, particularly for aircraft, of the kind in which gases are required to impinge upon the blades of a turbine. Such engine starter cartridges contain a charge of a substantially ashless combustion composition, for example a nitrocellulose-nitroglycerine composition, with suitable cooling ingredients and ignition means therefor. They operate by the application of the gas pressure developed through the combustion of the composition to actuate the engine starting means.

It is normal for unused cartridges to be mounted on the engine of the aircraft and when so mounted they are subject to considerable vibration. The cartridges must therefore, within the limitations of design and functional requirements, be as robust as possible in order to stand up, not only to handling and transport but also to this vibration. At the same time the cartridges must be sufficiently sensitive to function with reliability when required for use; particularly is this so in the case of fighter aircraft where speed of take-off may be vital. The field of this invention is one in which any improvement that can be made to the robustness of the cartridge without impairing its reliability can be of considerable importance.

In starter cartridges it is normal to space the combustion composition from the primer to provide room for the igniter or kindling composition; if free access for the gases from the kindling composition to the surfaces of the combustion composition is provided the positive action of the kindling composition is improved and it is therefore preferred to make provision for such gas flow, particularly in the case of the larger cartridges required for the starting of jet aircraft engines. In previous forms of such cartridges the combustion composition has been mounted upon studs or legs, sometimes of its own composition, with the kindling charge disposed in a muslin bag beneath the combustion composition and above the primer. With this construction it is possible for rough handling or excessive vibration to cause the spacing studs or legs to give way causing damage to the bag containing the kindling charge which, for example, may become punctured by contact with the metal of the primer thus permitting the escape of the kindling composition.

The present invention provides, as a component of an engine starter cartridge, a structural member that serves to hold the combustion composition spaced from the primer and to contain the kindling composition in a snug and secure manner; provision is made to allow for the circulation of gases from the kindling composition to the combustion composition and, in the preferred form, to locate the combustion composition centrally within the cartridge. The structural member is fashioned from a material that will withstand a high degree of mechanical shock without fracture, such as that caused by rough handling or excessive vibration and which, under the conditions of combustion in the cartridge, substantially retains its structural integrity; there is a wide range of suitable materials including metal, plastics, resin compositions and wood; it is not objectionable that the material may, for example, in the case of wood, be subjected to some burning in the cartridge with evolution of some volatile matter; it is important, however, that materials are not employed that are likely to disintegrate and cause the ejection of particles liable to damage the turbine of the starter assembly. It is preferred however to form the structural member from a thermoplastic resin composition, for example polythene, which is readily moulded to shape, is robust and has a degree of resilience.

The structural member has a seat, adapted to rest upon the bottom of the cartridge shell and to be a substantially snug fit therein; an aperture is provided in the seat to locate about the primer and extends upwards into the bottom of a well adapted to contain the kindling composition; a diaphragm on the bottom of the well covers the aperture and prevents escape of the kindling composition. The diaphragm is fashioned from a material, for example a natural or synthetic textile material, that is substantially completely consumed on combustion; it has been found advantageous that the diaphragm should be a coarse mesh to facilitate the passage of the flash from the primer. The diaphragm is firmly attached to its seating in the well of the structural member; where the structural member is formed of thermoplastic material, such as polyethylene, which is a preferred material, it is difficult to adhere the diaphragm satisfactorily except by the application of sufficient heat and pressure to soften the resin composition. If the diaphragm is applied in this way a firm attachment is obtained. The top of the well is adapted to be sealed, after filling with the kindling composition, by a second diaphragm having similar characteristics to the first one; the second diaphragm may be firmly attached to the top of the wall by heat rolling when the structural member is formed of thermoplastic resin. About the top of the well, and disposed at the periphery of the structural member are projections shaped to receive the base of the combustion composition. In a preferred form the peripheral projections are castellations adapted to locate the combustion composition centrally in the cartridge; these castellations are preferably stepped to provide a gas space between the kindling and combustion compositions.

Figure 1:
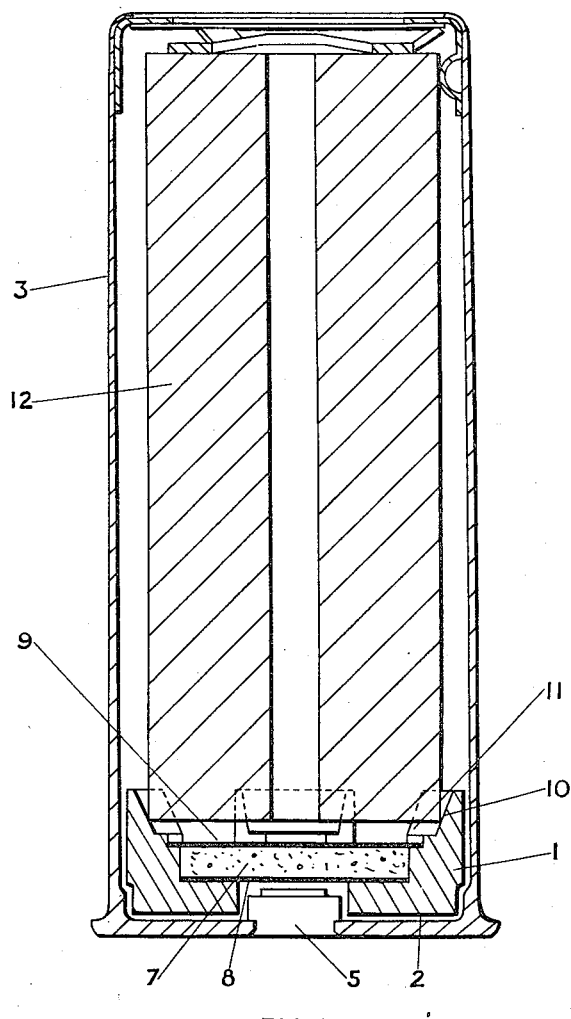
Figure 1 is a sectional view of the cartridge.
Figure 2:
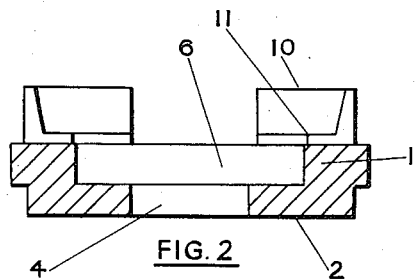
Figure 2, Figure 3 and Figure 4 are respectively, a cross sectional view, top view and perspective view of the structural member.
Figure 3:
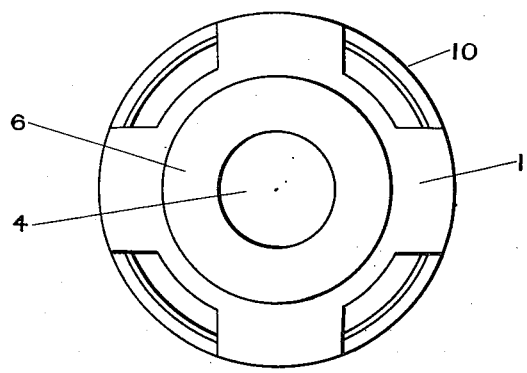
Figure 4:
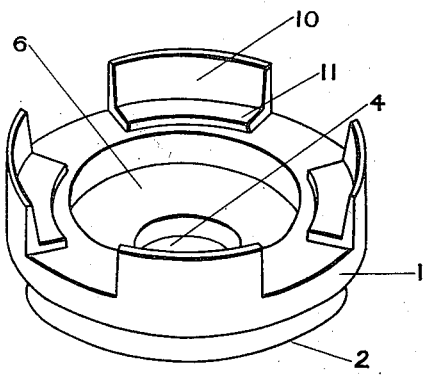

In the drawings which illustrate a preferred form of the invention a structural member 1 seats on its base 2 within the cartridge case 3 with an aperture 4 about the primer 5. A well 6, in the member 1 provides a receptacle for a kindling composition, for example, blackpowder 7. The well aperture 4 is covered by a diaphragm 8. After filling the kindling composition 7 into the well, it is enclosed by a second diaphragm 9 which is adhered to the top of the well. Thin films of waterproofing materials, such as polythene, may be applied to the diaphragms 8 and 9 to provide an atmospheric seal for the kindling compositions. Castellations 10 are provided at the upper edge of the member 1; these serve to hold the combustion composition 12 and to locate it centrally in the cartridge. Steps 11 allow the combustion composition 12 to be held with a slight clearance above the top of the well 6 to provide a gas space between it and the kindling composition.

What I claim is:

1. An engine starting cartridge of generally tubular form and including a base at one end thereof, said cartridge having: a charge of combustible material and ignition means therefor, a structural member made of an incombustible material arranged snugly within said cartridge and seating on said base, said member having a centrally disposed aperture in its base, said ignition means including a primer disposed in said aperture and said aperture terminating at its upper end above said primer, means defining a hollow space within said structural member and above said aperture, a diaphragm in the lower portion of said space covering the top of said aperture, said hollow space forming a well portion, said ignition means also including a kindling composition for said combustible material disposed in said well portion on top of said diaphragm, a second diaphragm on top of said kindling composition, said structural member including a seat for the combustible material beyond and out of direct contact with said diaphragms, said seat being defined by circumferentially-spaced upstanding projections above and radially outwardly of said well portion of said structural member.

2. An engine starting cartridge according to claim 1 wherein the upstanding projections of the structural member are of castellated form and peripherally disposed.

3. An engine starting cartridge according to claim 1 wherein the structural member is formed from a thermoplastic resin.

4. An engine starting cartridge according to claim 1 wherein the structural member is formed from polyethylene.

5. An engine starting cartridge according to claim 1 wherein the diaphragms enclosing the kindling material within the well of the structural member are of coarse mesh and of a material that is substantially consumed on combustion.

References Cited in the file of this patent

UNITED STATES PATENTS

| | | |
|---|---|---|
| 2,165,263 | Holm | July 11, 1939 |
| 2,466,561 | Standal | Apr. 5, 1949 |
| 2,667,837 | Musser et al. | Feb. 2, 1954 |
| 2,688,920 | Jarvis | Sept. 14, 1954 |